United States Patent

[11] 3,576,366

[72] Inventor John L. Sheaffer
 Bellevue Hill N.S.W., Australia
[21] Appl. No. 762,534
[22] Filed Sept. 25, 1968
[45] Patented Apr. 27, 1971
[73] Assignee Fotek Corporation Pty. Ltd.
 Brookvale, N.S.W., Australia
[32] Priority Oct. 26, 1968
[33] Australia
[31] 34181/68

[54] SUPPORT SYSTEM FOR TRAYS IN SLIDE PROJECTORS
5 Claims, 8 Drawing Figs.

[52] U.S. Cl. ............................................... 353/117
[51] Int. Cl. ......................................... G03b 23/06
[50] Field of Search.................................... 40/79;
 353/104, 118, 115, 103, 107, 114; 353/116, 117

[56] References Cited
UNITED STATES PATENTS
3,209,647 10/1965 Hall............................ 353/117
OTHER REFERENCES
Riviera Projector booklet and instruction manual
Liesigang Projector literature

*Primary Examiner*—Leonard Forman
*Assistant Examiner*—A. J. Mirabito
*Attorney*—Pendleton, Neuman, Williams & Anderson ABSTRACT: A slide projector having a housing with a longitudinally extending, U-shaped slide tray receiving channel and a support system designed to accept with equal facility either an elongated box slide tray or a circular slide tray. One wall of the slide tray receiving channel has a recess formed therein and bearing pads are disposed in the recess for contacting and rotatably supporting the hub portion of a circular slide tray. Stabilization pins are provided in the second wall and are adapted to contact the hub on the opposite side for maintaining the circular slide tray in position in the channel.

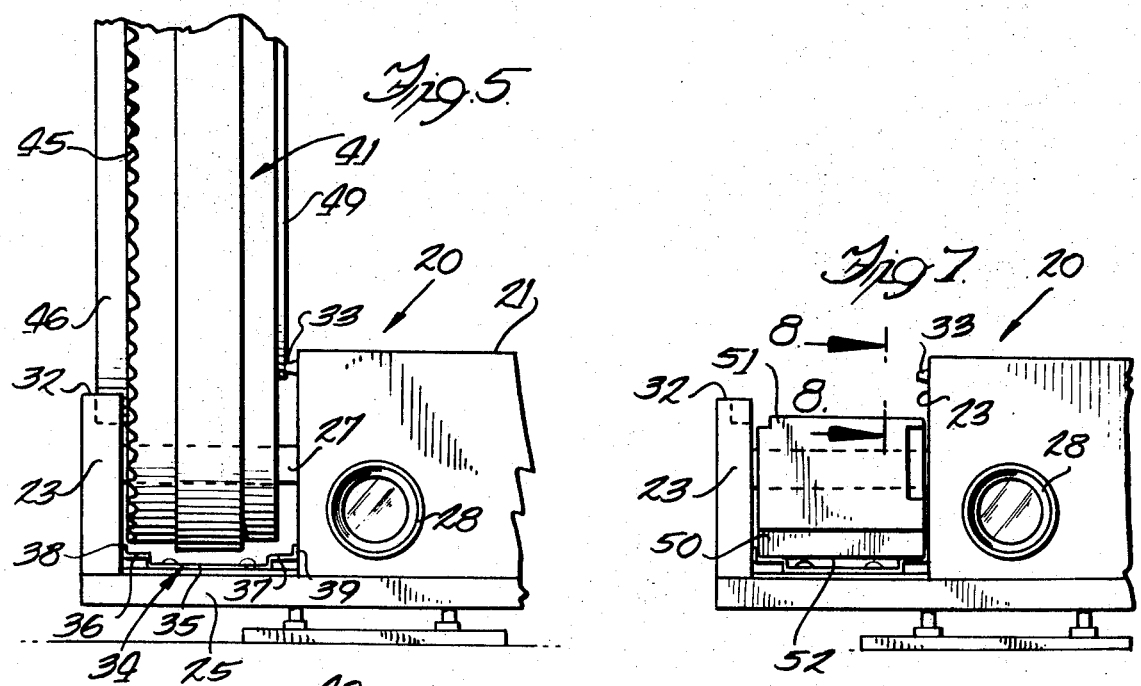
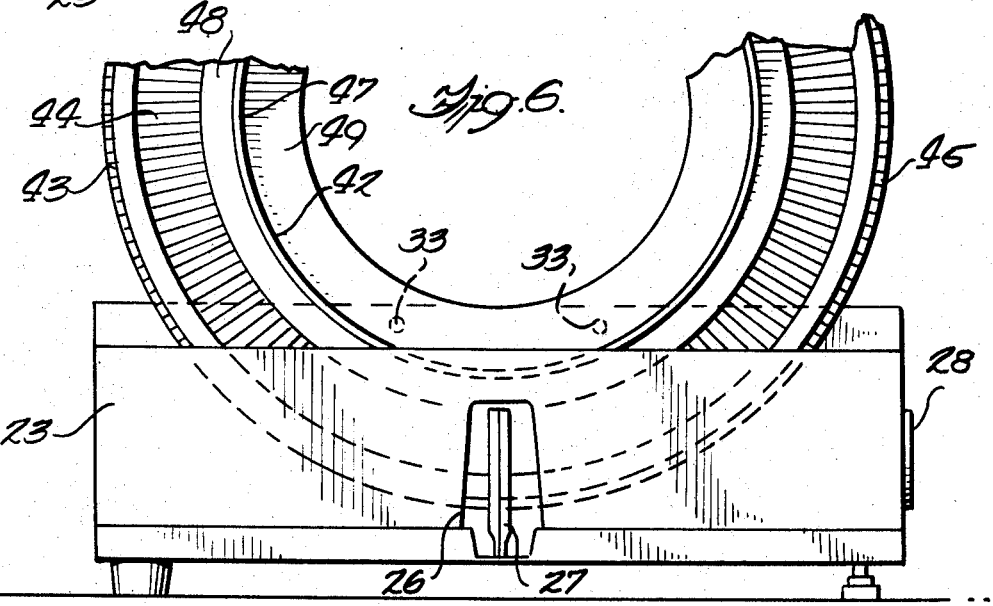
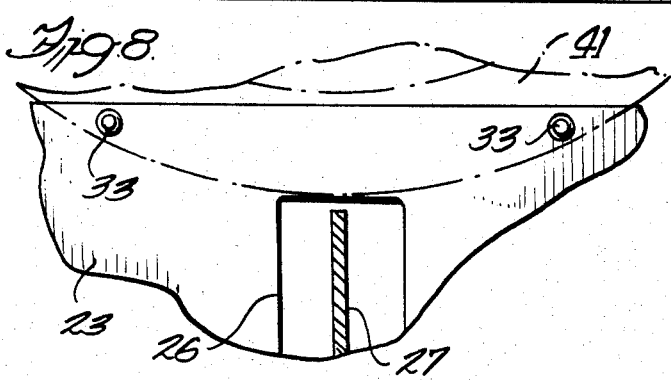

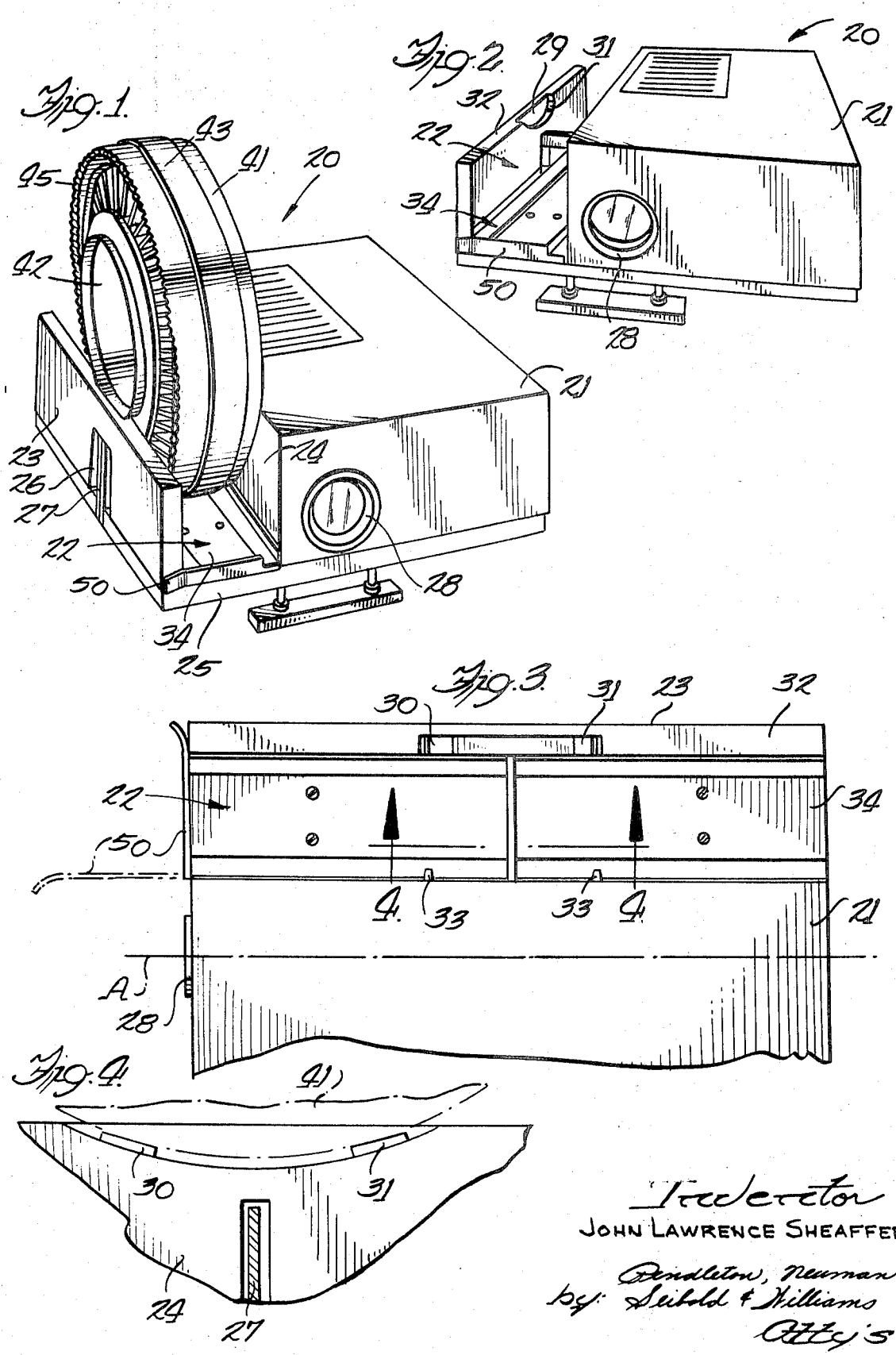

3,576,366

SUPPORT SYSTEM FOR TRAYS IN SLIDE PROJECTORS

BACKGROUND OF THE INVENTION

The field of the invention relates to a slide projector adapted to accept, with equal facility, either an elongated box slide tray or a circular slide tray.

In the prior art, attempts have been made to design a slide projector which could be used with either box slide trays or circular slide trays. One such attempt provided a support means which required mechanical manipulation with a tool such as a conventional screw driver to make the requisite changeover from acceptability for a box slide tray to acceptability for a circular tray. Another design utilized a support system including bearing pads and a base support disposed within the slide tray receiving channel for rotatably supporting the circular slide tray at its periphery. In order to obviate overturning of the tray during operation of the projector, it was necessary to design the support system within critical size tolerances to provide enough frictional resistance against overturning but not so much frictional resistance as to prevent the tray from rotating when the slide changer was actuated. The bearing pads in this design formed an obstruction in the slide tray receiving channel which prevented the box slide tray from being removed from the channel vertically.

The subject invention seeks to provide a versatile slide projector which obviates the disadvantages of the prior art projectors in a simple and efficient manner.

SUMMARY OF THE INVENTION

It is an object of the invention to provide an improved slide projector with a support system for accepting either a box slide tray or a circular slide tray.

A further object is to provide a support system for a slide projector wherein both the box slide tray and the circular slide tray may be vertically removed from the slide projector without the necessity of making a plurality of mechanical adjustments to the projector.

It is still a further object of the invention to provide an improved slide projector which is simple in form, easy to manufacture and efficient in operation.

The invention in one form comprises a slide projector having a longitudinally extending, U-shaped slide tray receiving channel with first and second side walls and a base member. A support system is provided and includes a recess formed in the first sidewall and a means disposed in the recess for rotatably supporting a circular slide tray at a first hub portion. At least one stabilization pin is secured to the second sidewall of the slide tray receiving channel and extends toward the first sidewall. The pins are adapted to contact the circular slide tray at a second hub portion on the opposite side of the tray for maintaining it in position in the channel. The sidewalls of the channel are substantially free from obstructions with the exception of the stabilization pins so that the box slide tray and the circular slide tray may be easily removed vertically from the slide projector.

BRIEF DESCRIPTION OF THE DRAWING

FIG. 1 is a perspective view of the slide projector embodying the invention in combination with a circular slide tray;

FIG. 2 is another perspective view of the slide projector embodying the invention;

FIG. 3 is a fragmentary plan view of the slide projector;

FIG. 4 is an enlarged, fragmentary sectional view taken along line 4—4 of FIG. 3;

FIG. 5 is a fragmentary elevational view of the slide projector in combination with a circular slide tray;

FIG. 6 is a fragmentary side view of the slide projector shown in FIG. 5.

FIG. 7 is a fragmentary elevational view of the slide projector in combination with a box slide tray; and FIG. 8 is an enlarged, fragmentary sectional view taken along line 8—8 of FIG. 7.

DESCRIPTION OF THE PREFERRED EMBODIMENT

Referring now to the drawing, an improved slide projector is shown in FIG. 1 and 2 and is generally indicated by the numeral 20. Projector 20 includes a housing 21 which is preferably rectangular and has a slide tray receiving channel 22 along one side thereof. Channel 22 extends longitudinally of the housing 21 and is parallel to the optical axis of the projector as indicated by line A in FIG. 3. The channel is U-shaped and is formed by sidewall 23, sidewall 24 and a base support member 25. An aperture 26 is provided in sidewall 23 for the passage of a slide receiving member 27 of a slide changer mechanism. Adjacent to sidewall 24 is a lens system 28 which extends generally parallel to the channel 22. The slide changer mechanism and the lens system in addition to other operating components such as the control means, blower, lamp and focusing system form no part of this invention and will not be described.

Sidewall 23 has a recess 29 formed in its inside surface which faces toward the second wall (FIGS. 2 and 3). Disposed within the recess are bearing pads 30 and 31 which are secured to the sidewall 23 by any suitable means. As seen by reference to FIG. 4, the bearing pads 30 and 31 are spaced from each other and are located below top surface 32 of sidewall 23. The recess is preferably arcuate and the bearing pads are preferably rectangular. The opposite sidewall 24 extends above top surface 32 of sidewall 23 and is provided with stabilization pins or pads 33 which extend into the channel 22 toward sidewall 23. The pins 33 are positioned above bearing pads 30 and 31 for a purpose which will be described later in the specification.

Base support member 25 includes a plate member 34 having a depressed portion 35 and two flanges 36 and 37 (FIGS. 5 and 7). The flanges 36 and 37 are vertically spaced above depressed portion 35 and have upwardly extending member 38 and 39 integral therewith. The plate is secured to base support member 25 by screws or the like.

The recess 29 with its bearing pads 30 and 31, stabilization pins 33 and the base support member 25 constitute the support system for the box and circular slide trays. In order to more clearly understand the manner in which a circular tray can be rotatably supported in the projector, reference is made to FIGS. 1, 4—6 and 8 where a circular tray 41 is shown in its operating position in the tray receiving channel 22. Circular tray 41 has an inner hub 42 and an outer wall or band 43. Radial partitions 44 extend between the hub and the outer wall and form chambers for receiving conventional 35 mm slides. One side of tray 41 is provided with a toothed edge 45 which cooperates with the slide changer mechanism (not shown). A concentric hub ring 46 is secured to inner hub 42 by an adhesive or any other suitable means. Alternatively, the concentric hub ring may be manufactured integral with the circular tray. Hub ring 46 has an outwardly extending circular flange 47 and an integral peripheral flange 48 which contacts inner hub 42. The circular flange 47 has a smooth exterior surface and slides on pads 30 and 31 when the tray is rotated by the slide changer mechanism.

The manner in which the tray is supported at its hub in the projector is more clearly shown in FIGS. 4 and 5. The outer wall 43 of the tray does not contact plate member 34 of base support member 25 when the tray is positioned in channel 22 (FIG. 5). As indicated above, recess 29 may be arcuate and it preferably has a radius greater than the radius of flange 47 of the tray. The thickness of pads 30 and 31 are preferably equal to the difference in radii between the recess 29 and the flange 47. Circular tray 41 further includes an annular hub 49 on the side opposite the concentric hub 46 (FIG. 5). The stabilization pins 33 contact annular hub 49 and maintain the tray in the operable vertical position within the channel 22. The pins are located below the top surface of housing 21, but above the top surface 32 of sidewall 23. This placement allows the pins to contact annular hub 49 and provide the proper vertical stabilization for the tray 41 during operation of the slide projector.

In FIG. 7 an elongated box slide tray 51 is shown disposed in channel 22 of the slide projector 20. Box slide tray 51 is provided with a toothed bottom edge which is adapted to cooperate with the slide changer mechanism. The tray is further provided with partitions which form chambers for housing the slides. The lower surface 52 of tray 51 contacts only flanges 36 and 37 of plate member 34. As a result of this limited contact, the frictional drag between tray 51 and plate member 34 of base support member is very low. In order to assure proper alignment of tray 51 within the channel as the tray slides, a guide member 50 is provided which is hinged to base support member 25 near sidewall 24 for movement generally perpendicular to the front face of projector 20. Leaf springs (not shown) may be secured to flanges 38 and 39 for contacting and guiding the box slide tray. When the guide member is extended or opened as shown by the dotted lines in FIG. 3, it serves to guide the box tray 51 as it travels in channel 22 out the front face of the projector. The guide member is normally closed when a circular tray is being used as shown in FIG. 1.

The assembly and disassembly of the slide trays can be accomplished in a simple and expeditious manner by initially manually pulling the slide changer mechanism out of engagement with the channel 22. Circular tray 41 may then be positioned so that the circular flange 47 sits in recess 29 and engages pads 30 and 31 (FIG. 5). The tray 41 can be removed by lifting it upwardly and out of contact with the projector. The box slide tray 51 can be properly positioned by placing it in channel 22 so that the toothed edge is adjacent to sidewall 23. Tray 51 may be vertically removed or longitudinally slid out of engagement with the channel 22. Since there are no obstructions in the slide tray receiving channel with the exception of stabilization pins 33, the box tray 51 can be easily removed vertically from the projector.

An alternative embodiment of the invention employs a rectangular chamber extending longitudinally through the housing instead of a U-shaped channel. With this embodiment a rectangular opening is provided in the top portion of the housing in open communication with and directly above the chamber. The support system would be the same as that used in the first described embodiment. In this embodiment the box slide tray can be loaded and removed from the projector either by sliding it longitudinally in and out of the chamber opening or by vertically dropping it through the rectangular opening. The circular slide tray can be loaded and removed vertically.

Preferably, the circular slide tray, the box slide tray and the stabilization pins are manufactured from a durable synthetic plastic material. The concentric hub ring when it is manufactured as a separate piece may be molded from a different plastic or it may be molded from the same plastic that is used to form the circular tray. The bearings pads may be manufactured from metal or a plastic material.

The support system of this invention does not require the critical size tolerances that are required of the prior art projectors to obviate overturning. The supporting of the circular tray at its inner hub ring reduces the possibility of overturning which often occurs due to eccentric loading of the tray. Pads 30 and 31 in recess 29 of the slide tray receiving channel together with stabilization pins 33 provide sufficient frictional resistance to prevent the tray from rotating more than one slide chamber at a time, and yet allow the tray to rotate one slide chamber at a time upon actuation of the slide changer mechanism.

Thus, it is seen that an improved slide projector has been provided which has a support system that is designed to accept, with equal facility, either an elongated box slide tray or a circular slide tray.

While a particular embodiment of the invention has been shown, it is to be understood that the invention is not limited thereto since many minor modifications may be made; and it is, therefore, contemplated by the appended claims to cover any such modifications as fall within the true spirit and scope of the invention.

The invention having thus been described, what is claimed and desired to be secured by Letters Patent is:

I claim:

1. A slide projector in combination with a circular slide tray, said circular slide tray including a first hub on one face thereof extending outwardly of the body of said circular slide tray having an axially extending flange on said one face thereof and a second hub on the opposite face; said slide projector including a housing having an elongated tray receiving cavity, said cavity comprising said first and second sidewalls and a base, said first sidewall having a top surface and an inside surface, a support system for supporting either an elongated, box slide tray or said circular slide tray, said support system comprising a recess formed in said first sidewall and extending downwardly from said top surface thereof and inwardly from said inside surface, means disposed in said recess rotatably supporting said circular slide tray at said axially extending flange, stabilizing support means disposed adjacent said second sidewall and contacting the second hub of said circular tray for maintaining the tray in a substantially upright position with respect to the cavity base, the sidewalls of said cavity and said support means being relatively disposed so that either type of slide tray may be removed vertically from said cavity.

2. The invention according to claim 1 wherein the recess is arcuate.

3. The invention according to claim 1 wherein the means disposed in said recess of said first sidewall comprises two spaced bearing pads which contact and support said circular slide tray at said axially extending flange.

4. The invention according to claim 1 wherein said base member includes a longitudinally extending horizontal base member and two vertically spaced, longitudinal flanges attached thereto and disposed above said base member whereby the box slide tray contacts only the longitudinal flanges of said base member when it is in position in the slide tray receiving cavity.

5. The invention according to claim 1 wherein the stabilizing support means includes two pins which extend toward said first sidewall and contact said second hub, said pins being vertically disposed above the bearing pads.